UNITED STATES PATENT OFFICE.

FRANK W. BORTNER, OF AUGUSTA, OHIO.

CEREAL COFFEE AND PROCESS OF MAKING SAME.

1,030,711.  Specification of Letters Patent.  Patented June 25, 1912.

No Drawing.  Application filed January 26, 1912.  Serial No. 673,613.

*To all whom it may concern:*

Be it known that I, FRANK W. BORTNER, a citizen of the United States, residing at Augusta, in the county of Carroll and State of Ohio, have invented a new and useful Cereal Coffee and Process of Making Same, of which the following is a specification.

My invention relates to a substitute for coffee, and process of making same and more especially to such a substitute made from wheat, by the process hereinafter described.

The objects of the invention are to produce a substitute for coffee capable of making an infusion or decoction of agreeable taste and aroma very similar to the taste and aroma of true coffee.

Further objects are to produce a cereal coffee of desirable and pleasing characteristics which will be comparatively inexpensive while at the same time beneficial rather than deleterious to health and to produce the same by a process neither intricate nor expensive.

A still further object is to do away with the bitter taste which is characteristic of substitutes for coffee heretofore commonly employed.

These objects, together with other objects which will be apparent to those skilled in the art may be attained by the process hereinafter described, although it will be understood that certain variations may be made without departing from the spirit of the invention or the scope of the appended claims.

In producing a substitute for coffee in accordance with my invention sound, first-quality wheat should preferably be selected, said wheat being free from cockle and other foreign grains and substances. The wheat should then be cleaned and scoured in accordance with the practice in modern mills, as will be understood by those skilled in the art. When the wheat has been thus scoured it should be ground one reduction on corrugated, chilled rolls, thus, in the terms of the art, putting it through the first break roll on a short process mill. Having passed through the first break roll the ground wheat is then passed over a 16 to 20 wire scalping sieve for the purpose of removing all of the fine particles including as much of the flour, germ and gluten as it is possible to remove without further grinding. The remaining coatings of the grains will be found to be somewhat covered with flour dust and to remove the same said coatings are next passed through a purifying machine such as commonly employed in mills of modern construction wherein, by means of a blast of air operating, the said fine flour dust is removed. The coatings at this stage of the process contain all of the outer coatings of the wheat grains together with such portions of the body of the grains as lie next and are connected to said outer coatings and have not been freed from said coatings by the grinding described.

The coatings are then mixed with molasses (Palmetto brand preferred), in the proportions of one pound of molasses for each eight pounds of coatings. After thorough mixture the coatings should then be roasted, as in an oven, at a temperature the same, or slightly hotter than that employed in the baking of bread. During the roasting process the coatings should preferably be agitated to prevent caking and to produce uniform roasting of the particles.

Here it should be noted that by the steps of my process previous to the roasting the particles of the coatings are of substantially uniform size, and no small particles or dust of flour or portions of the coatings are present to be too quickly roasted and scorched, thus preventing in a large measure the bitter taste which would otherwise result from the small burned particles.

The roasting process should be carried forward quickly until the material has attained a brown color slightly lighter than that of ordinary roasted coffee. The product thus made may then be withdrawn from the oven or roaster and used as needed and is well adapted to be put up for the market and sold in packages or otherwise commercially. Cereal coffee thus produced contains that portion of the wheat grain which is richest in food value and a decoction made by using about one tablespoonful of the cereal coffee for each cup of beverage desired is not only highly nutritious but also very palatable, resembling in taste and aroma the best grade of true coffee. Moreover the use of such cereal coffee will encourage the various organs of digestion to a healthy performance of their proper functions.

I claim;—

1. Cereal coffee composed of the outer coatings of wheat grains secured by passing said grains through the first break roll of a short process mill mixed with molasses and roasted to a brown color.

2. That process of making a coffee substitute which consists in passing scoured wheat grains through the first break roll of a short process mill, scalping the resulting product on a sixteen to twenty wire sieve, to remove fine particles, flour, flour dust, germs and gluten, mixing the scalped product with molasses and roasting said mixture.

In testimony that I claim the above, I have hereunto subscribed my name in the presence of two witnesses.

FRANK W. BORTNER.

Witnesses:
  RALPH FAULK,
  MAGGIE FAULK.